United States Patent
Primos et al.

(10) Patent No.: US 7,037,167 B2
(45) Date of Patent: May 2, 2006

(54) WHISTLE GAME CALL APPARATUS AND METHOD

(75) Inventors: Wilbur R. Primos, Madison, MS (US); Paul E. Korn, Baldwin, WI (US)

(73) Assignee: Primos, Inc., Flora, MS (US)

( * ) Notice: Subject to any disclaimer, the term of this patent is extended or adjusted under 35 U.S.C. 154(b) by 203 days.

(21) Appl. No.: 10/752,179

(22) Filed: Jan. 6, 2004

(65) Prior Publication Data
US 2005/0148280 A1 Jul. 7, 2005

(51) Int. Cl.
A63H 5/00 (2006.01)
(52) U.S. Cl. .................................. 446/204
(58) Field of Classification Search ........ 446/202–209, 446/397, 216; 84/330, 380 R, 402, 403, 84/383 R, 398, 388, 380 B, 384, 378; 116/137 R
See application file for complete search history.

(56) References Cited

U.S. PATENT DOCUMENTS

| | | | | |
|---|---|---|---|---|
| 696,814 A | * | 4/1902 | Hatch | 446/206 |
| 1,735,697 A | * | 11/1929 | Rutkowski | 446/204 |
| 2,053,982 A | * | 9/1936 | Weis | 446/205 |
| 3,066,443 A | * | 12/1962 | Mobley | 446/204 |
| 3,750,521 A | | 8/1973 | Dolmetsch | 84/380 |
| 3,955,313 A | | 5/1976 | Faulk | 46/178 |
| 3,991,513 A | * | 11/1976 | Faulk | 446/208 |
| 4,151,678 A | | 5/1979 | Robertson | 46/180 |
| 4,737,130 A | * | 4/1988 | Mann | 446/207 |
| 4,752,270 A | | 6/1988 | Morton | 446/207 |
| 4,821,670 A | * | 4/1989 | Foxcroft et al. | 116/137 R |
| 4,850,925 A | * | 7/1989 | Ady | 446/207 |
| 4,888,903 A | | 12/1989 | Knight et al. | 43/1 |
| 4,950,198 A | | 8/1990 | Repko, Jr. | 446/207 |
| 5,230,649 A | | 7/1993 | Robertson | 446/204 |
| 5,564,360 A | * | 10/1996 | Wright | 116/137 R |
| 5,885,126 A | * | 3/1999 | Carlson | 446/208 |
| 5,885,127 A | | 3/1999 | Colyer | 446/208 |
| 6,413,139 B1 | * | 7/2002 | Douglas | 446/204 |
| D486,413 S | | 2/2004 | Primos | D10/119 |
| 6,709,309 B1 | * | 3/2004 | Bishop et al. | 446/202 |

FOREIGN PATENT DOCUMENTS

JP    09212171 A  *  8/1997

OTHER PUBLICATIONS

Printed Publication showing Maurilio Whistle #8, 1984
Article in *Western Outdoors* about Maurilio No. 8 Duck Call, p. 74, Oct. 1984.
Internet Advertisement for Samba Whistles, Sound Effects and Bird Calls, www.larkinam.com Internet Advertisement for Samba Whistle, www.explorersdrums.com.
Internet Advertisement for Maurilio Whistles, BrazilDrums.com.

* cited by examiner

*Primary Examiner*—John A. Ricci
(74) *Attorney, Agent, or Firm*—Holland & Hart

(57) ABSTRACT

A whistle-type game call for reproducing sounds made by certain whistling animals, such as ducks or other waterfowl, without manipulating (e.g., rolling, vibrating, fluttering, etc.) the tongue. The whistle may include a sound chamber with one or more protruding ridges to space a free-floating tubular member contained by the sound chamber from an internal surface of the sound chamber. The spacing between the free-floating tube and the internal surface of the sound chamber prevents the free-flowing tubular member from sticking to the internal surface of the sound chamber due to accumulations of water, dirt, saliva, or any other foreign substances. The whistle may also include a hole for a lanyard to more conveniently carry the game call. The game call may be constructed from two halves, one of the halves having a ridge track and the other having a recess receptive of the ridge track to ensure proper alignment of the two halves.

14 Claims, 4 Drawing Sheets

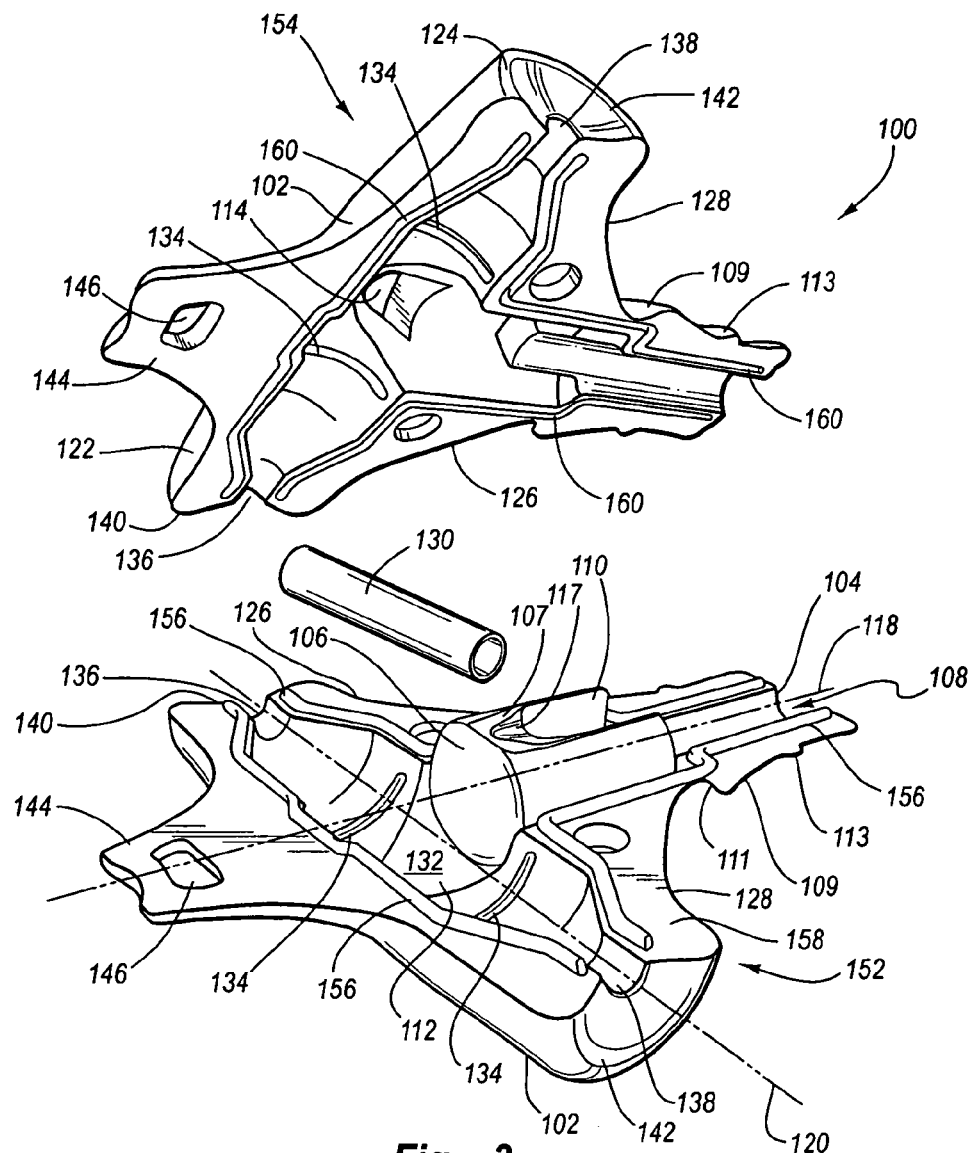
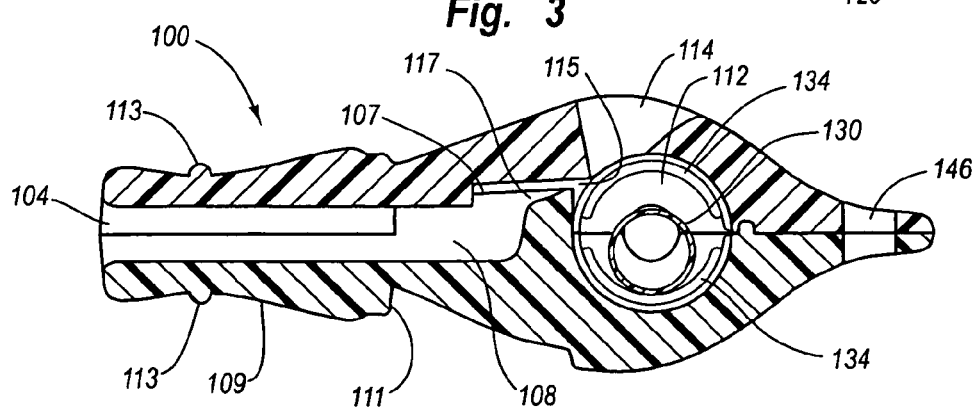
Fig. 3
Fig. 4

WHISTLE GAME CALL APPARATUS AND METHOD

FIELD OF THE INVENTION

The present invention relates to game calls, and more particularly to whistle-type game calls for simulating sounds of wild animals.

BACKGROUND OF THE INVENTION

Game calls, which produce sounds similar to those of game or wild animals, have existed in many different forms for many years. Game calls are used by hunters, wildlife watchers, and other persons who wish to simulate the sounds of wild animals. There are many different types of game calls, all intended for the same general purpose: to mimic the sounds of a particular animal or animals as realistically as possible. Some calls are designed to attract animals of the same type or species, others are intended to attract predators of an animal the call is intended to mimic.

Broadly speaking, there are at least three primary categories of game calls that have existed over the years: diaphragm calls, reed calls, and whistle-type calls. Diaphragm calls typically utilize a latex membrane stretched across an air passage opening such that the diaphragm vibrates as air passes through the passage. Diaphragm game calls are, however, difficult for many to use effectively. In fact, many types of diaphragm calls can never be mastered by certain segments of the population.

Reed-type game calls are perhaps the most common type of game call. Reed-type game calls typically include a reed disposed adjacent an air passage. Air is usually forced through the air passage by an operator through a mouthpiece, which causes the reed to vibrate at a certain tone or pitch, creating a sound that is emitted from an outlet of the call. Some reed-type game calls have multiple reeds and air passages that are selectively opened or closed to simulate a variety of animal or fowl sounds. For waterfowl such as wild ducks and geese, reed-type game calls simulate a wide variety of sounds made by such waterfowl. For certain sounds, however, an operator must be able to manipulate (e.g., roll, vibrate, flutter, etc.) his or her tongue in an appropriate manner while blowing on the call, which proves difficult for many users.

Whistle-type game calls comprise a third major category of game calls. Whistle-type game calls are commonly used to simulate whistling sounds made by certain waterfowl, particularly ducks. For example, the mallard drake (male) duck produces a hiss that is extremely difficult if not impossible to simulate with a reed or diaphragm-type call. Other species of ducks, including the widgeon, teal, wood duck, and pintail make whistling sounds that are simulated by whistle-type calls, rather than reed or diaphragm-type calls. However, most conventional whistles utilize one or more balls or peas disposed inside a resonant chamber to provide a vibrato effect. When air is forced into the resonant chamber of such calls, the ball or pea moves around the chamber, periodically blocking the outlet to create a staccato-type effect. Nevertheless, whistles using a ball or pea may not mimic certain waterfowl sounds as closely as desired. Other calls, such as the Maurilio™ whistle attempt to more closely simulate certain waterfowl sounds by disposing a solid or hollow cylinder inside a resonant chamber instead of a ball or pea.

The whistle calls developed to mimic the whistling duck species mentioned above suffer, however, from a number of problems. The internal air passageway housing the free-floating balls or tubes inevitably accumulate saliva, water, and dirt, which can cause the ball or tube to stick to the interior of the air passageway. When the ball or tube sticks to the interior of the air passageway, the staccato effect caused by the movement of the ball or tube inside the resonant chamber is lost, and there is usually a reduction in the volume of sound emitted from the whistle. Further, most whistle calls are relatively small, and easily dropped or misplaced. There is a need for a game call whistle that reduces the effects of dirt and saliva accumulation, and can be more easily carried and stored.

SUMMARY OF THE INVENTION

The present invention provides a whistle-type game call for reproducing sounds made by certain animals, such as ducks or other waterfowl. The whistle-type call according to the present invention eliminates any need by the user to manipulate his or her tongue while blowing on the call. In one embodiment, the whistle-type call includes a sound or resonant chamber with one or more protruding ridges or rails to space a free-floating tube contained by the sound chamber from an internal wall or surface of the sound chamber. The spacing between the free-floating tube and the internal surface of the sound chamber prevents the free-floating tube from sticking to the internal wall or surface of the sound chamber due to accumulations of water, dirt, or saliva. The whistle may also include a hole for looping a string or other filament to carry the whistle. The whistle may be constructed from a pair of mating halves, with one of the halves having a ridge track and the other having a recess receptive of the ridge track to ensure proper alignment of the two halves.

Other objects, features, and advantages of the invention will become apparent from the following detailed description of the invention with reference to the accompanying drawings.

BRIEF DESCRIPTION OF THE DRAWINGS

Preferred embodiments of the invention are described below with reference to the accompanying drawings:

FIG. 3 is an exploded perspective view of the whistle game call illustrated in FIGS. 1–2 according to one embodiment of the present invention;

FIG. 4 is a sectional side elevation view of the whistle game call of FIG. 1 according to one embodiment of the present invention;

Throughout the drawings, identical reference numbers and descriptions may indicate similar, but not necessarily identical elements.

DETAILED DESCRIPTION OF THE INVENTION

Figure 1:
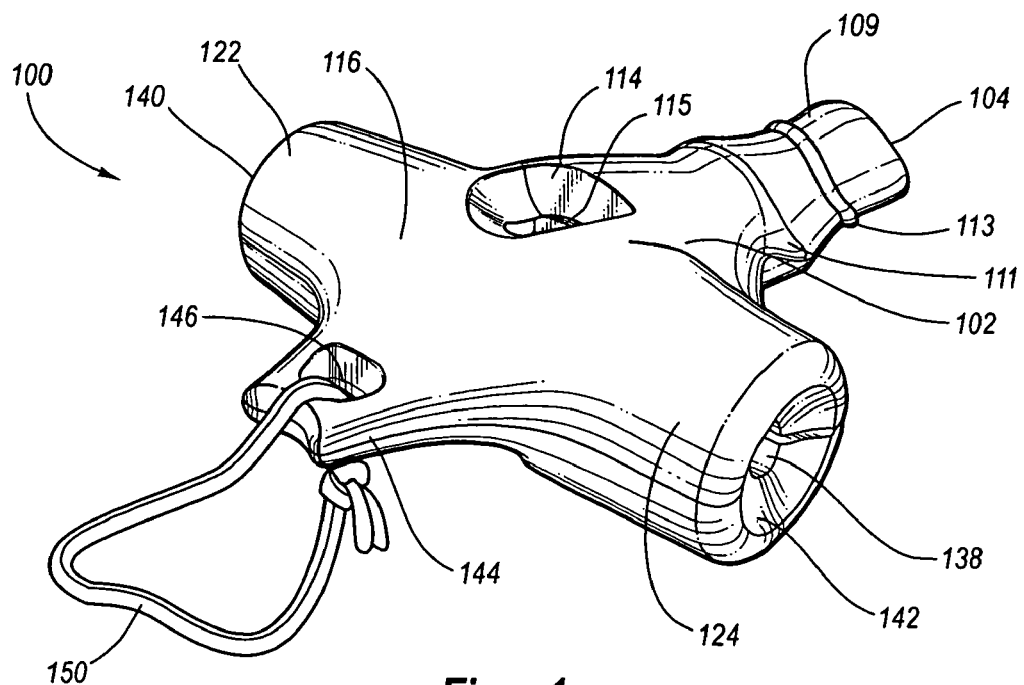
FIG. 1 is a top perspective view of a whistle game call according to one embodiment of the present invention.

The present invention comprises a whistle-type game call for mimicking animal sounds, particularly certain waterfowl sounds. The present invention also comprises a method of making and using such whistle-type game calls. The whistle-type game calls described herein accurately reproduce waterfowl sounds without the need for users to manipulate (e.g., roll, vibrate, flutter, etc.) their tongues while blowing on the call. The whistle-type game call is also designed to reduce problems created when water, dirt, and saliva accumulate inside the resonant chamber of the whistle, which is a common problem with prior whistle-type calls. The principles described herein may be used with other types of game calls to improve the accuracy of the sounds and the performance of the calls.

As used throughout the specification and claims, the word "track" means a groove, rail, or ridge that holds or guides a device or apparatus. The terms "tube" or "tubular" mean either hollow and solid members that are generally cylindrical. The words "including" and "having," as used in the specification, including the claims, shall have the same meaning as the word "comprising."

FIGS. 1–4 show a whistle-type game call 100 according to one embodiment of the present invention. The game call 100 comprises a housing 102 having an open first end 104, a closed second end 106 (FIG. 2), and an air passageway 108 (FIGS. 3–4) formed therebetween. The air passageway 108 creates a path through which a stream of air can be forced through the call by a user. The air stream flowing through the air passageway creates a whistle, which is one type of sound generator that may be utilized by the present invention.

A mouthpiece portion 109 is formed at one end of the call to provide a structure around which a user's mouth may comfortably circumscribe to blow the steam of air into the housing 102. The mouthpiece 109 gradually increases in diameter from the open first end 104. An abrupt step 111 is formed at a second end of the mouthpiece portion 109. The mouthpiece portion 109 of the housing 102 also includes a circumferential ridge 113 arranged approximately mid-way between the first end 104 and the step 111. The ridge 113 may serve to prevent the call from slipping out of the user's mouth, and thus provides a hands-free feature to the call. More specifically, the user can bite the mouthpiece or place his or her lips on the mouthpiece so that the ridge is inside the user's lips or teeth to prevent the call from slipping out of the user's mouth. According to some embodiments, however, the circumferential ridge 113 may be located elsewhere along the mouthpiece portion 109, or may be omitted altogether.

Although the second end 106 of the housing 102 is closed, there is an opening 110 (FIG. 3) along the air passageway 108 to provide for fluid movement between the air passageway 108 and a resonant or sound chamber 112 (FIGS. 3–4) defined by the housing 102. Accordingly, a flow of air passes through the whistle 100 by entering into the first end 104, flowing along the air passageway 108, passing through the opening 110 (FIG. 3), and entering into the cavity 112. A portion of the airflow may split and may exhaust through a first air vent 114 disposed in a top 116 (FIG. 1) of the housing 102. The first air vent 114 is adjacent to the cavity 112 and shaped generally as a half-circle or half-ellipse. While the second closed end 106 is generally circular, a top surface 107 (FIGS. 3–4) of the closed second end 106 is flattened to truncate a portion of the circular configuration of the closed end 106 and create a gap 115 (FIGS. 1, 4) between the closed second end 106 and the first air vent 114. Air may thus flow through the gap 115 as it passes through the opening 110 discussed above. Further, the top portion 107 (FIGS. 3–4) may include a funnel 117 to channel or direct air through gap 115.

Figure 2:
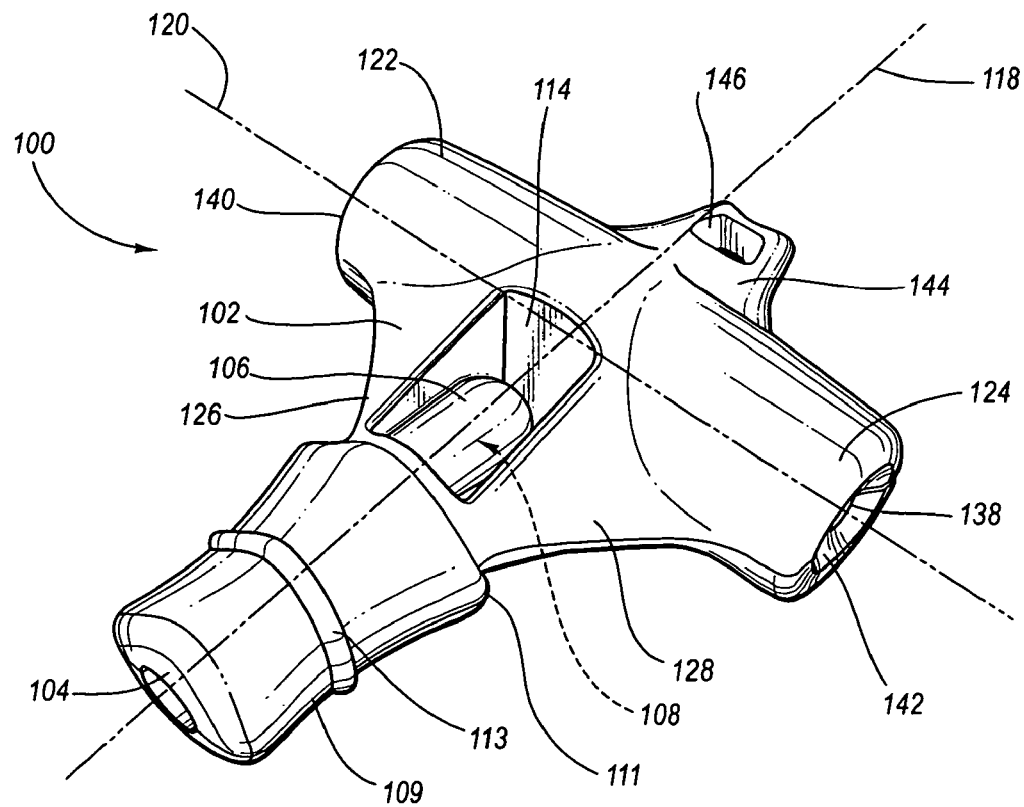
FIG. 2 is a bottom perspective view of the whistle game call of FIG. 1 according to one embodiment of the present invention.
Figure 5:
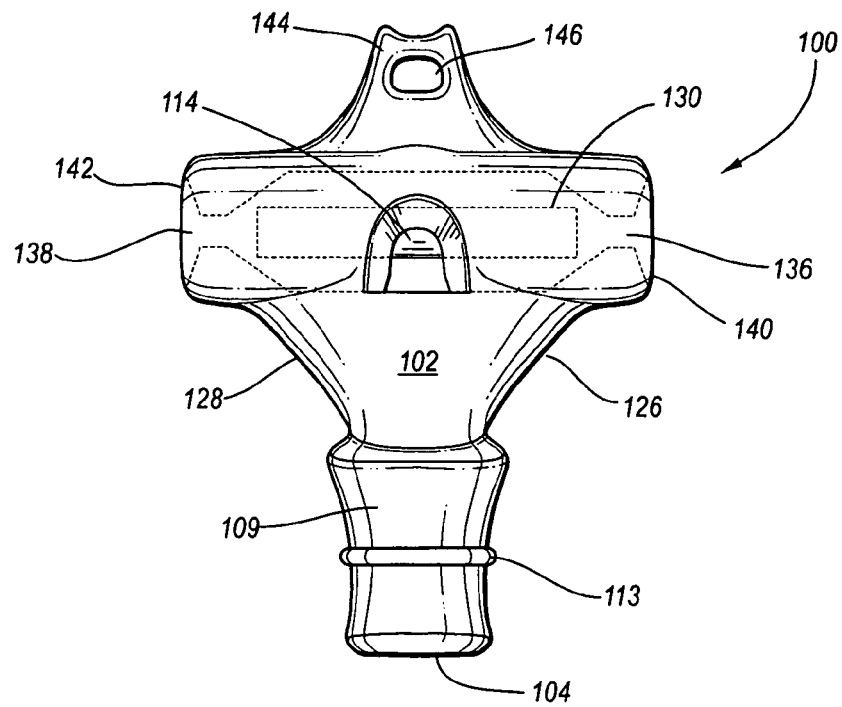
FIG. 5 is a top view of the whistle game call illustrated in FIG. 1 according to one embodiment of the present invention.
Figure 6:
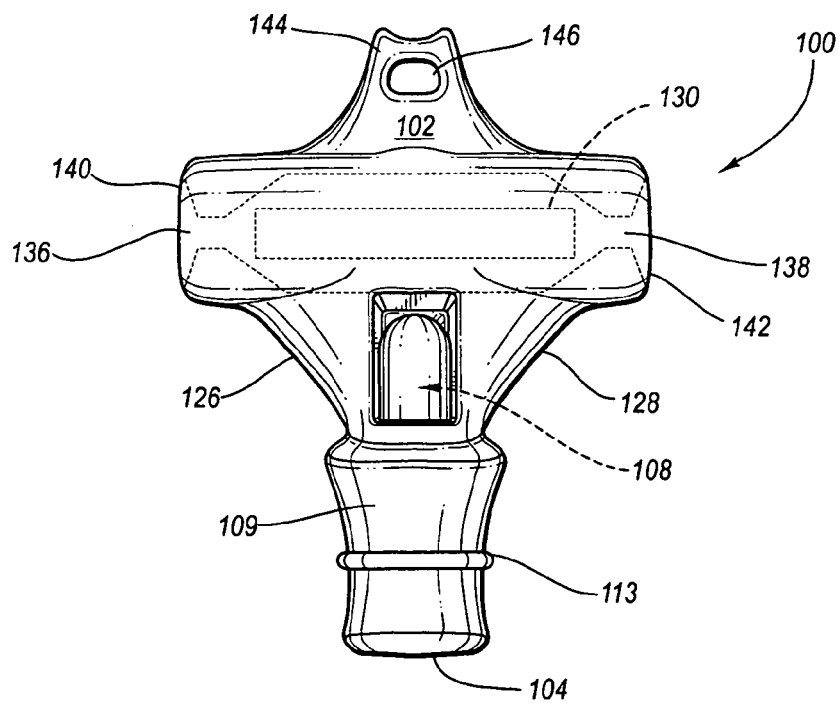
FIG. 6 is a bottom view of the whistle game call illustrated in FIG. 1 according to one embodiment of the present invention.
Figure 7:
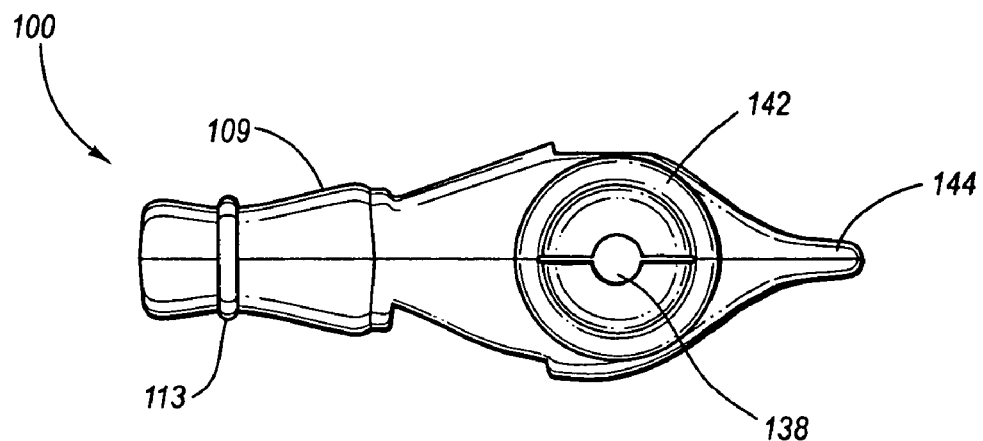
FIG. 7 is a side elevation view of the whistle game call illustrated in FIG. 1 according to one embodiment of the present invention.
Figure 8:
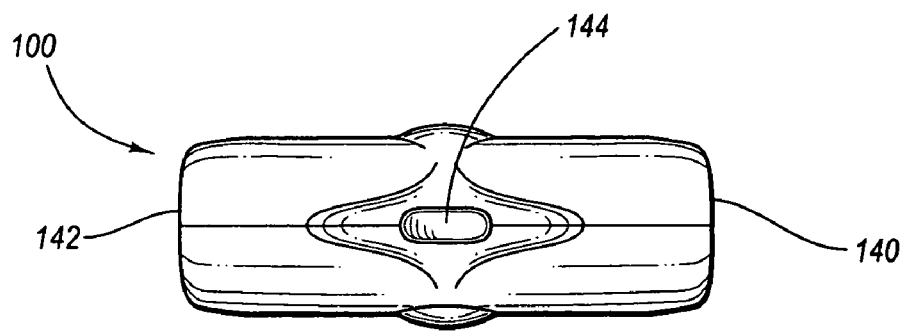
FIG. 8 is a front view of the whistle game call illustrated in FIG. 1 according to one embodiment of the present invention.
Figure 9:
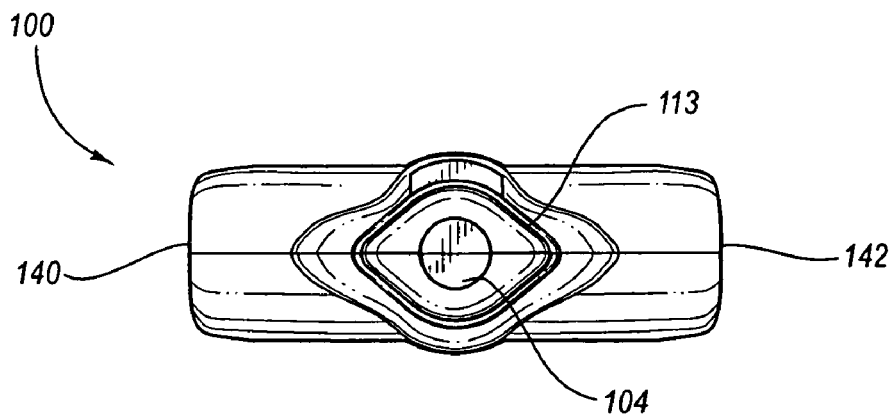
FIG. 9 is a rear view opposite of the first end view of the whistle game call illustrated in FIG. 8 according to one embodiment of the present invention.

The housing 102 according to FIGS. 1–4 is generally T-shaped and includes a major axis 118 and a minor axis 120 (FIG. 2). The air passageway 108 (FIGS. 3–4) is parallel to and substantially aligned with the major axis 118. The resonant chamber or sound chamber 112, on the other hand, is in the form of a cavity and is oriented transverse to the air passageway 108. Sound chamber 112 is parallel with and substantially aligned with the minor axis 120. The cavity 112 comprises first and second tubular side member portions 122, 124 that extend substantially perpendicularly from the major axis 118 along the minor axis 120. According to the embodiment shown, however, the side member portions 122, 124 are integrally formed with the housing 102 and are not separate from the housing 102. First and second tapered necks 126, 128 extend from the tubular side member portions 122, 124 to the mouthpiece portion 109.

The cavity 112 tapers down on each side and terminates at relatively small second and third air vent or exit holes 136, 138 at the respective ends 140, 142. In addition, each of the ends 140, 142 is indented toward the small second and third air vent holes 136, 138. While the interior cavity 112 is tapered toward ends 140, 142, the outside diameter of the side members 122, 124 remains generally constant.

As shown in FIGS. 3–4, a generally tubular or cylindrical member, such as a free-floating hollow cylinder 130, is disposed inside cavity 112. The hollow cylinder 130 fits loosely inside the generally cylindrical cavity 112 such that the cylinder rolls around or circulates the inside surface or wall of cavity 112 when a user blows on the call 100. The rolling cylinder causes a staccato or vibrating sound to be emanated by the call 100, without the need for the user to manipulate (e.g., rolling, vibrating, fluttering, etc.) his or her tongue. As mentioned above, however, the cavity 112 and/or the hollow cylinder 130 will inevitably accumulate water, dirt, or saliva resulting from use of the whistle 100. Any foreign substance introduced into cavity 112 may cause the hollow cylinder 130 to stick to the internal surface 132 (FIG. 3) of the cavity 112. Therefore, to reduce the effects of the dirt accumulation, the cavity 112 includes a plurality of protrusions in the form of annular rails or ridges 134 (FIGS. 3–4) that space the hollow cylinder 130 from the internal surface 132. The rails 134 dramatically reduce the surface area that the cylinder 130 contacts when the call is operated. Accordingly, accumulation of water, dirt, and saliva are much less likely to cause the hollow cylinder 130 to stick to the internal surface 132, because the hollow cylinder 130 rests on the rails 134.

The size of the whistle 100 is relatively small, and therefore easily dropped, misplaced, or lost. Therefore, a tapered tab 144 opposite of the open first end 104 and substantially aligned with the major axis 118 (FIG. 2) is included according to the embodiment shown with a hole or passage 146 extending therethrough. The hole 146 is receptive of a cord or rope such as a lanyard 150 shown looping through the hole 146 in FIG. 1. The lanyard 150 can be placed around the neck, arm, or other appendage of a user to reduce the occurrence of loss and increase the carrying convenience to the user. The lanyard 150 may also be attached, for example, to a key chain, belt, loop, or any other item.

As shown in FIG. 3, the housing 102 of the whistle 100 may comprise two halves, a first half 152 and a second half 154, which may, for example, be made of injection molded plastic or other material. The first and second halves 152, 154 are shaped to mate with one another to produce the whistle 100 as shown in FIGS. 1–2. For example, the first half 152 includes a ridge or track 156 projecting from an inner surface 158 of the first half 152. The track 156 extends along most or all of both the air passageway 106 and the cavity 112. The second half 154 includes a trough such as a mating recess or track 160 receptive of the protruding track 156 to facilitate alignment of the first and second halves 152, 154, and to prevent the halves 152, 154 from sliding relative to one another. Each of the first and second halves may contain two or more of the plurality of cavity ridges 134 that space the hollow cylinder 130 from the internal surface 132. The first and second halves 152, 154 may be connected to one another by any suitable fastening method, including, but not limited to, adhesive, glue, rivets, welding—including ultrasonic welding, heat stamping, screws, snaps, or other fasteners. In addition, according to some embodiments the halves 152, 154 may be formed of one unitary piece, rather than from separate pieces.

FIGS. 5–9 show the principle views of the whistle 100, with features such as the cavity 112 and hollow cylinder 130 shown with hidden lines. Accordingly, applying the principles taught herein, the whistle 100 can be used by any outdoor enthusiast or others to accurately mimic wild animal sounds, especially whistling ducks, by blowing into the housing 102.

While this invention has been described with reference to certain specific embodiments and examples, it will be recognized by those skilled in the art that many variations are possible without departing from the scope and spirit of this invention. The invention, as described by the claims, is intended to cover all changes and modifications of the invention which do not depart from the scope of the invention.

The invention claimed is:

1. A game call, comprising:
   a housing having a sound chamber disposed therein and a first air vent in fluid communication with the sound chamber, the sound chamber comprising an internal surface;
   a generally tubular member disposed in the sound chamber;
   a first ridge protruding from the sound chamber to space the tubular member from the internal surface;
   wherein the housing comprises mating first and second halves;
   wherein each of the first and second halves comprise a portion of the first ridge.

2. A game call, comprising:
   a housing having a sound chamber disposed therein and a first air vent in fluid communication with the sound chamber, the sound chamber comprising an internal surface;
   a generally tubular member disposed in the sound chamber;
   a first ridge protruding from the sound chamber to space the tubular member from the internal surface;
   wherein the housing is generally T-shaped and comprises a tubular cross-member portion of substantially constant diameter.

3. A game call according to claim 2, further comprising a taper from opposing sides of the tubular cross-member portion to a mouthpiece portion of the housing.

4. A game call according to claim 2, further comprising indentions and second and third air vents disposed in ends of the tubular cross-member portion.

5. A game call according to claim 2, further comprising a second ridge separated from the first ridge to space the tubular member from the internal surface.

6. A whistle game call, comprising:
   a first half having a first air vent hole;
   a second half mated to the first half;
   the first and second halves cooperating to define an interior air passageway and an internal sound chamber;
   a generally tubular member disposed in the internal sound chamber, the sound chamber having an inside wall;
   a plurality of rails formed on the inside wall of the sound chamber to space the tubular member from the inside wall of the sound chamber.

7. A whistle game call according to claim 6 wherein the first and second halves comprise corresponding holes defining a passage receptive of a filament.

8. A whistle game call according to claim 6 wherein the first and second halves comprise a major axis and a minor axis substantially perpendicular to one another, wherein a first air passageway is aligned with the major axis and in fluid communication with the sound chamber, and the sound chamber is aligned with the minor axis.

9. A whistle game call according to claim 6 wherein the first and second halves further comprise a tapered neck between the first air passageway and the sound chamber.

10. A whistle game call according to claim 6 wherein the first and second halves cooperate to define an external mouthpiece at the first air passageway, the external mouthpiece including a circumferential ridge.

11. A whistle game call according to claim 6 wherein the first half comprises an internal recess and the second half comprises an internal ridge, wherein the internal recess is matingly receptive of the internal ridge.

12. A whistle game call according to claim 6 wherein the internal recess and internal ridge are arranged substantially all the way along a perimeter of the internal air passageway and sound chamber.

13. A game call, comprising:
   a housing having an open first end, a closed second end, and a cavity formed therebetween;
   a first air vent disposed in the housing and in fluid communication with the open end and the cavity;
   a free-floating tubular member disposed in the cavity;
   a mouthpiece integrally formed with the housing at the open first end;
   side-members integrally formed with the housing and having holes therein in fluid communication with the cavity;
   cavity ridges in the cavity for spacing the tubular member from an interior surface of the cavity.

14. A method of making a game call whistle, comprising:
   providing a first housing half comprising a ridge track and a first portion of an air passageway;
   providing a second housing half comprising a recess receptive of the ridge track and a second portion of the air passageway;
   inserting a tubular member between the first and second housing halves;

engaging the ridge track with the recess;
enclosing the air passageway between the first and second housing halves;
further comprising providing one or both of the first and second housing halves with a transverse cavity having a plurality of internal ridges to space the tubular member from an internal surface of the transverse cavity.

* * * * *